(12) United States Patent
Yang et al.

(10) Patent No.: US 12,307,660 B2
(45) Date of Patent: May 20, 2025

(54) METHOD AND SYSTEM FOR AUTOMATIC CALCIUM SCORING FROM MEDICAL IMAGES

(71) Applicant: SHENZHEN KEYA MEDICAL TECHNOLOGY CORPORATION, Shenzhen (CN)

(72) Inventors: Hao-Yu Yang, Seattle, WA (US); Junjie Bai, Seattle, WA (US); Youbing Yin, Kenmore, WA (US); Qi Song, Seattle, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 381 days.

(21) Appl. No.: 17/505,917

(22) Filed: Oct. 20, 2021

(65) Prior Publication Data
US 2022/0284571 A1 Sep. 8, 2022

Related U.S. Application Data

(60) Provisional application No. 63/157,141, filed on Mar. 5, 2021.

(51) Int. Cl.
*G06T 7/00* (2017.01)
*G06N 3/08* (2023.01)
*G06N 20/00* (2019.01)

(52) U.S. Cl.
CPC ............ *G06T 7/0012* (2013.01); *G06N 3/08* (2013.01); *G06N 20/00* (2019.01);
(Continued)

(58) Field of Classification Search
CPC ......... G06T 7/0012; G06T 2207/10081; G06T 2207/30008; G06T 2210/41;
(Continued)

(56) References Cited

U.S. PATENT DOCUMENTS

2010/0260400 A1* 10/2010 Bernhardt .............. A61B 6/504
382/131
2013/0094749 A1* 4/2013 Oh .......................... A61B 6/466
382/133
(Continued)

FOREIGN PATENT DOCUMENTS

CN 111882652 A * 11/2020 ......... G06K 9/00201

OTHER PUBLICATIONS

Artificial Intelligence in Cardiac CT: Automated Calcium Scoring and Plaque Analysis (Year: 2020).*
(Continued)

*Primary Examiner* — Jennifer Mehmood
*Assistant Examiner* — Pardis Sohraby
(74) *Attorney, Agent, or Firm* — Bayes PLLC

(57) ABSTRACT

Embodiments of the disclosure provide systems and methods for medical image analysis. A method may include receiving a medical image acquired of a subject by an image acquisition device. The method may also include applying a calcium detection model to detect at least one calcium region relevant in determining a calcium score from the medical image. The method may further include applying a score regression learning model to the at least one calcium region to determine a calcium score for the medical image. The method may additionally include providing the determined calcium score of the medical image for a diagnosis of the subject.

16 Claims, 6 Drawing Sheets

(52) U.S. Cl.
CPC ............... *G06T 2207/10081* (2013.01); *G06T 2207/30008* (2013.01); *G06T 2210/41* (2013.01)

(58) Field of Classification Search
CPC . G06T 2207/20081; G06T 2207/20084; G06T 2207/30101; G06N 3/08; G06N 20/00; G06N 3/0464; G06N 3/09
USPC .......................................................... 382/131
See application file for complete search history.

(56) References Cited

U.S. PATENT DOCUMENTS

| | | | | |
|---|---|---|---|---|
| 2019/0159737 | A1* | 5/2019 | Buckler | A61B 6/5217 |
| 2019/0228524 | A1* | 7/2019 | Chen | G16H 30/40 |
| 2020/0029923 | A1* | 1/2020 | Wilson | A61B 6/5264 |
| 2020/0327664 | A1* | 10/2020 | Wilson | G06F 18/2431 |
| 2021/0042927 | A1* | 2/2021 | Amis | G16H 30/40 |
| 2021/0248743 | A1* | 8/2021 | Tang | A61B 5/02007 |

OTHER PUBLICATIONS

Automatic coronary artery calcium scoring in cardiac CT angiography using paired convolutional neural networks (Year: 2016).*

Lee et al., Artificial Intelligence in Cardiac CT: Automated Calcium Scoring and Plaque Analysis, pp. 1-9, Oct. 2, 2020, Current Cardiovascular Imaging Reports, https://www.researchgate.net/profile/Christian-Tesche/publication/344567305_Artificial_Intelligence_in_Cardiac.CT_Automated_Calcium_Scoring_and_Plaque_Analysis/links/5f80817aa6fdccfd7b5511e4/Artificial-Intelligence-in-Cardiac-CT-Automated-Calcium-Scoring-and-Plaque-Analysis.pdf†

Isgum et al., A pattern recognition approach to automated coronary calcium scoring, pp. 1-4, Sep. 2004, Proceedings of the 17th International Conference on Pattern Recognition, 2004. ICPR 2004, https://d1wqtxts1xzle7.cloudfront.net/43069448/A_Pattern_Recognition_Approach_to_Automa20160225-1371-16f569s-libre.pdf.†

Van Velzen et al., Deep Learning for Automatic Calcium Scoring in CT: Validation Using Multiple Cardiac CT and Chest CT Protocols, pp. 66-79, Apr. 2020, Radiology, https://www.ncbi.nlm.nih.gov/pmc/articles/PMC7106943/pdf/radiol.2020191621.pdf.†

Isgum et al., Automatic Coronary Calcium Scoring in Low-Dose Chest Computed Tomography, pp. 2322-2334, Dec. 2012, IEEE Transactions on Medical Imaging, https://repository.ubn.ru.nl/bitstream/handle/2066/110344/1/110344.pdf.†

\* cited by examiner
† cited by third party

METHOD AND SYSTEM FOR AUTOMATIC CALCIUM SCORING FROM MEDICAL IMAGES

CROSS-REFERENCE TO RELATED APPLICATION

This application claims the benefit of priority to U.S. Provisional Application No. 63/157,141, filed on Mar. 5, 2021, the entire content of which is incorporated herein by reference.

TECHNICAL FIELD

The present disclosure relates to systems and methods for determining calcium scores from medical images, and more particularly to automatically detecting and computing calcium scores for relevant calcium regions from medical images using learning models.

BACKGROUND

Calcium scoring is a quantitative measure of the calcium plaque buildup around a vessel. Multiple approaches of calcium scoring exist, such as Agatston score, volume score, and mass score. Among them, Agatston calcium score is the most widely used indicator of plaque burden and cardiovascular disease risk. The higher the Agatston calcium score is, the greater risk a patient is at for vascular disease.

Traditionally, Agatston calcium scoring is determined based on an independent non-contrast computed tomography (NCCT) image scan. An observer manually selects voxels around vessels that are brighter than a predefined threshold (e.g., >130 HU) as calcium, and then the calcium scoring is calculated based on a predefined formula, depending on the brightness of each calcium region. This process relies on a human to differentiate calcium regions around vessels from other calcium-deposited regions, such as the aorta and bones.

Computed tomography angiography (CTA) is another type of image modality in which patients are injected with a contrasting agent to enhance vessel visibility under computed tomography (CT) scan. CTA is commonly carried out to assess patients' vessel conditions. However, calcium scoring cannot be easily computed in CTA as the vessels now also have a high and variable intensity, which causes deposited calcium to have a different appearance than that of NCCT. Other image modalities useful for vessel calcium evaluation include magnetic resonance (MR), ultrasound or intravascular imaging including intravascular ultrasound (IVLTS), and optical coherence tomography (OCT), etc. However, obtaining a calcium score for vessels from these image modalities is also nontrivial.

Embodiments of the disclosure address the above problems by providing methods and systems for automatically detecting and computing calcium scores for relevant calcium regions from medical images using learning models.

SUMMARY

Novel systems and methods for automatically detecting and computing calcium scores for relevant calcium regions from medical images using learning models are disclosed.

In one aspect, embodiments of the disclosure provide a system for determining a calcium score from a medical image. The system may include a communication interface configured to receive the medical image acquired of a subject by an image acquisition device. The system may additionally include at least one processor configured to apply a calcium detection model to detect at least one calcium region relevant in determining a calcium score from the medical image. The at least one processor may further be configured to apply a score regression learning model to the at least one calcium region to determine a calcium score for the medical image. The at least one processor may additionally be configured to provide the determined calcium score of the medical image for a diagnosis of the subject.

In another aspect, embodiments of the disclosure also provide a method for determining a calcium score from a medical image. The method may include receiving a medical image acquired of a subject by an image acquisition device. The method may also include applying a calcium detection model to detect at least one calcium region relevant n determining a calcium score from the medical image. The method may further include applying a score regression learning model to the at least one calcium region to determine a calcium score for the medical image. The method may additionally include providing the determined calcium score of the medical image for a diagnosis of the subject.

In yet another aspect, embodiments of the disclosure further provide a non-transitory computer-readable medium having a computer program stored thereon. The computer program, when executed by at least one processor, performs a method for determining a calcium score from a medical image. The method may include receiving a medical image acquired of a subject by an image acquisition device. The method may also include applying a calcium detection model to detect at least one calcium region relevant in determining a calcium score from the medical image. The method may further include applying a score regression learning model to the at least one calcium region to determine a calcium score for the medical image. The method may additionally include providing the determined calcium score of the medical image for a diagnosis of the subject.

It is to be understood that both the foregoing general description and the following detailed description are exemplary and explanatory only and are not restrictive of the disclosure, as claimed.

DETAILED DESCRIPTION

Reference will now be made in detail to the exemplary embodiments, examples of which are illustrated in the accompanying drawings.

The present disclosure provides a diagnostic image analysis system that can automatically determine a calcium score for a medical image without the requirement of human intervention. The disclosed diagnostic image analysis system may include a calcium region detection model that automatically detects calcium regions from a medical image, and a calcium score regression model that automatically computes or regresses the calcium score for each detected calcium region. The disclosed diagnostic image analysis system thus can automatically acquire calcium scores for an input medical image without requiring human intervention.

In some embodiments, when detecting calcium regions from a medical image, the disclosed diagnostic image analysis system does not detect each calcium-containing region in the medical image, but rather only detect calcium-containing regions that are considered as "relevant." Here, the calcium regions that are considered as relevant regions may include calcium regions that can provide some valuable information in evaluating risk of coronary artery disease. For instance, certain calcium regions around the coronary artery in a medical image may be considered to be relevant while calcium regions around the aorta or other locations may be considered as "irrelevant," since these calcium regions do not provide valuable information in evaluating risk of coronary artery disease.

Figure 1:
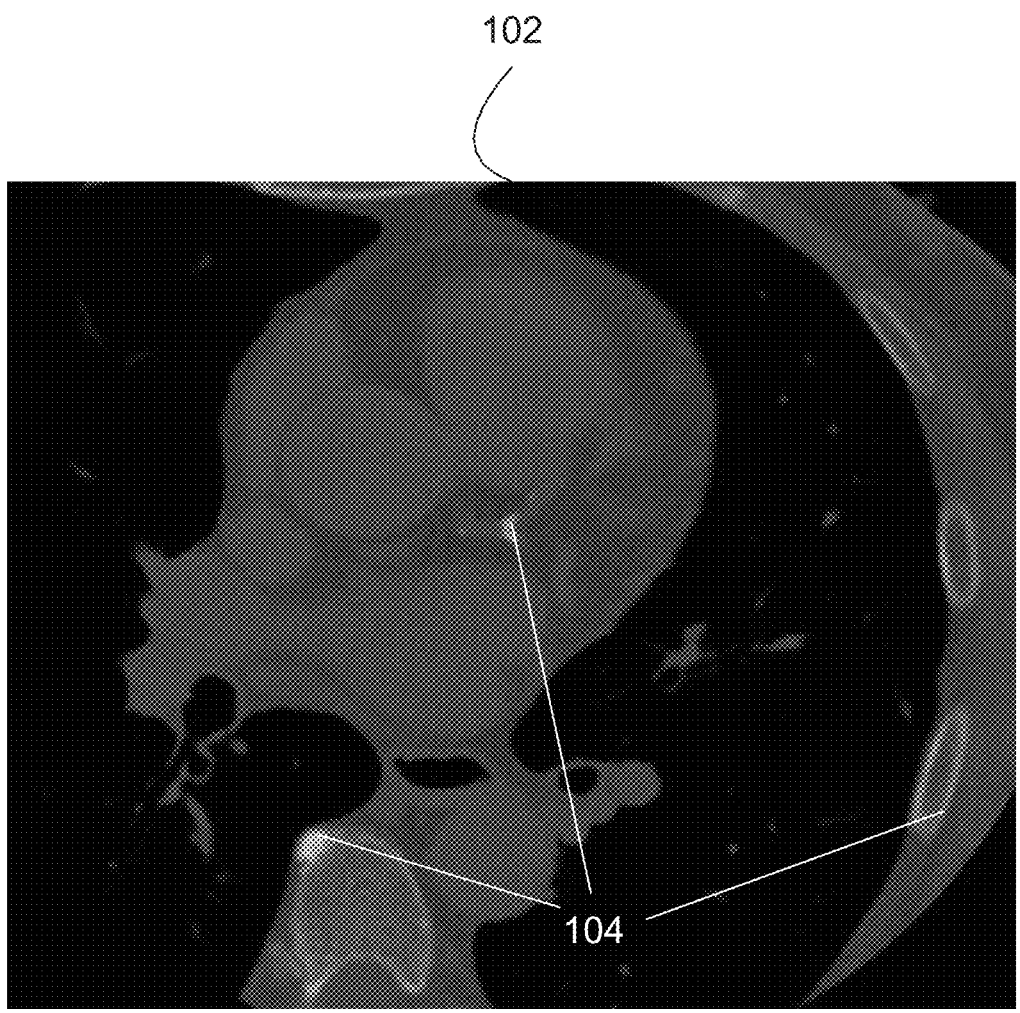
FIG. 1 illustrates an example frontal view of a medical image scan containing a calcium deposit.

While other existing calcium detection systems rely on human intervention to differentiate relevant calcium regions (e.g., calcium deposit around coronary artery) from irrelevant regions (e.g., calcium deposit at other locations), the disclosed diagnostic image analysis system uses a calcium detection model that automatically detects calcium regions as relevant. That is, the disclosed diagnostic image analysis system may automatically differentiate the calcium deposit detected around the coronary artery from the calcium deposit detected from other locations. For example, FIG. 1 illustrates an example frontal view of a medical image scan 102 containing multiple calcium regions 104 from an NCCT scan. The disclosed diagnostic image analysis system may include one or more deep learning or other machine learning models that are trained to identify relevant calcium regions without human intervention. Based on the images used for training and the models includes in the system, the disclosed diagnostic image analysis system may automatically detect calcium regions that occurred in different forms from various medical image sources.

In some embodiments, the disclosed diagnostic image analysis system may also compute or regress calcium scores for the detected relevant calcium regions. The disclosed diagnostic image analysis system may use a deep neural network-based regressor, linear regressor, or other non-neural network-based regressors to compute or regress calcium scores for the detected relevant calcium regions. In some embodiments, a calcium score may be computed or regressed for each instance of detected relevant calcium region. In some embodiments, an overall calcium score may be computed or regressed for a medical image as a whole.

In some embodiments, the disclosed diagnostic image analysis system may be an end-to-end system that integrates calcium region detection and calcium score computation or regression into a single path. For instance, the models used for calcium deposit detection and calcium score calculation or regression may be implemented jointly (e.g., sequentially) by outputting the detected relevant calcium regions directly into score regression models for computing or regressing calcium scores. Therefore, the disclosed diagnostic image analysis system may directly and automatically output calcium scores for an input medical image without human intervention, which thus greatly saves the time and human resources required in medical image diagnostic analysis.

Although FIG. 1 shows FIG. 1, a medical image from an NCCT scan, in some embodiments, the disclosed diagnostic image analysis system may also perform calcium scoring on other suitable types of images, such as CTA, dual-energy CTA, spectral CT, MR, ultrasound, IVUS, and OCT imaging. Being able to obtain calcium scores using these less-invasive imaging modalities may reduce the patient's exposure to extra radiation of NCCT images just for the sake of obtaining a calcium score. For instance, by training a dedicated calcium detection model, calcium regions can be detected in CTA even though a global intensity threshold no longer works. Therefore, the disclosed diagnostic image analysis system provides an improved capacity compared to the existing calcium detection systems.

In some embodiments, the disclosed diagnostic image analysis system may compute any type of scoring: volume score, mass score, Agatston score, or other types of more advanced scoring scheme. In some embodiments, in addition to the total scores for the whole vessel tree, the disclosed diagnostic image analysis system may provide the score measurements for vessel segments, branches, paths, or vessel groups. Therefore, the disclosed diagnostic image analysis system may provide improved flexibility when compared to the existing calcium scoring systems.

The features and advantages described herein are not all-inclusive and many additional features and advantages will be apparent to one of ordinary skill in the art in view of the figures and the following descriptions.

Figure 2:
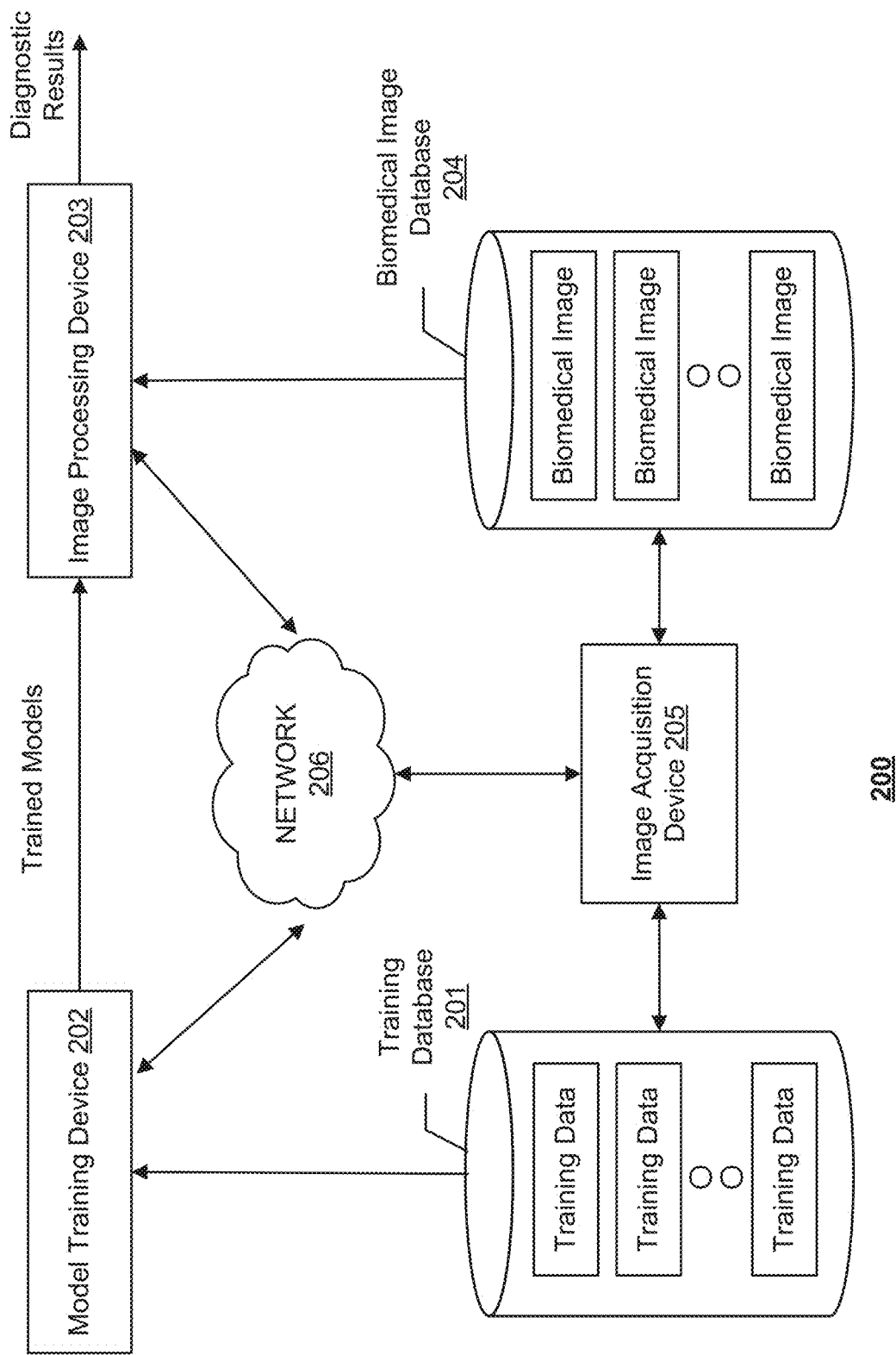
FIG. 2 illustrates a schematic diagram of an exemplary diagnostic image analysis system, according to certain embodiments of the present disclosure.

FIG. 2 illustrates an exemplary diagnostic image analysis system 200, according to some embodiments of the present disclosure. Consistent with the present disclosure, diagnostic image analysis system 200 may be configured to analyze a medical image acquired by an image acquisition device 205 and perform a diagnostic prediction (e.g., calcium score prediction) based on the image analysis.

In some embodiments, image acquisition device 205 may be using one or more imaging modalities including, but are not limited to, NCCT, CTA, dual-energy CTA, spectral CT, MR, ultrasound, BTUS, and OCT imaging. For example, image acquisition device 205 may be an independent non-contrast computed tomography imaging modality that captures NCCT images. In some embodiments, image acquisition device 205 may capture images containing at least one calcium region, as shown in FIG. 1, which illustrates an example frontal view of a medical image scan containing multiple calcium regions 104 from an NCCT scan.

As shown in FIG. 2, diagnostic image analysis system 200 may include components for performing two phases, a training phase and a prediction phase. The prediction phase may also be referred to as an inference phase. To perform the training phase, diagnostic image analysis system 200 may include a training database 201 and a model training device 202. To perform the prediction phase, diagnostic image analysis system 200 may include an image processing device 203 and a medical image database 204. In some embodiments, diagnostic image analysis system 200 may include more or less of the components shown in FIG. 2. For example, when a diagnosis model for providing a diagnostic prediction based on the medical images is pre-trained and provided, diagnostic image analysis system 200 may include only image processing device 203 and medical image database 204.

Diagnostic image analysis system 200 may optionally include a network 206 to facilitate the communication among the various components of diagnostic image analysis system 200, such as databases 201 and 204, devices 202, 203, and 205. For example, network 206 may be a local area network (LAN), a wireless network, a cloud computing environment (e.g., software as a service, platform as a service, infrastructure as a service), a client-server, a wide area network (WAN), etc. In some embodiments, network 206 may be replaced by wired data communication systems or devices.

In some embodiments, the various components of diagnostic image analysis system 200 may be remote from each other or in different locations and be connected through network 206 as shown in FIG. 2. In some alternative embodiments, certain components of diagnostic image analysis system 200 may be located on the same site or inside one device. example, training database 201 may be located on-site with or be part of model training device 202. As another example, model training device 202 and image processing device 203 may be inside the same computer or processing device.

Model training device 202 may use the training data received from training database 201 to train a diagnosis model for analyzing a medical image received from, e.g., medical image database 204, in order to provide a diagnostic prediction. As shown in FIG. 2, model training device 202 may communicate with training database 201 to receive one or more sets of training data, In certain embodiments, each set of training data may include ground truth calcium regions obtained through human annotation and/or ground truth calcium scores obtained from NCCT images or its equivalent (such as virtual NCCT images obtained by dual-energy CT), following traditional calcium scoring procedures.

In some embodiments, the training phase may be performed "online" or "offline." "Online" training refers to performing the training phase contemporarily with the prediction phase, e.g., learning the model in real-time just prior to analyzing a medical image. An "online" training may have the benefit to obtain a most updated learning model based on the training data that is then available. However, "online" training may be computational costive to perform and may not always be possible if the training data is large and/or the model is complicated. Consistent with the present disclosure, "offline" training is used where the training phase is performed separately from the prediction phase. The learned model trained offline is saved and reused for analyzing images.

Model training device 202 may be implemented with hardware specially programmed by software that performs the training process. For example, model training device 202 may include a processor and a non-transitory computer-readable medium (discussed in detail in connection with FIG. 3). The processor may conduct the training by performing instructions of a training process stored in the computer-readable medium. Model training device 202 may additionally include input and output interfaces to communicate with training database 201, network 206, and/or a user interface (not shown). The user interface may be used for selecting sets of training data, adjusting one or more parameters of the training process, selecting or modifying a framework of the learning model, and/or manually or semi-automatically providing prediction results associated with an image for training.

Consistent with some embodiments, the diagnosis model may include a variety of modules arranged in series and/or in parallel. For example, as will be shown in FIG. 4B, a modality recognition module 410, a region of interest module 412, a calcium detection module 404, and a score regression module 406 may be implemented in series. Although not illustrated in FIG. 4B, in some alternative embodiments, modality recognition module 410 may be implemented in parallel with region of interest module 412, rather than in series. In some embodiments, one or more modules included in the diagnosis model may be variously implemented using deep learning or other machine learning models. For example, calcium detection module 404 may use one or more deep learning or other machine learning modules to detect relevant calcium regions from input medical images.

Returning to FIG. 2, the trained diagnosis model may be used by the image processing device to analyze new medical images for diagnosis purposes. Image processing device 203 may receive the diagnosis model, e.g., an end-to-end calcium scoring model 400, from model training device 202. Image processing device 203 may include a processor and a non-transitory computer-readable medium (discussed in detail in connection with FIG. 3). The processor may perform instructions of a medical image diagnostic analysis program stored in the medium. Image processing device 203 may additionally include input and output interfaces (discussed in detail in connection with FIG. 3) to communicate with medical image database 204, network 206, and/or a user interface (not shown). The user interface may be used for selecting medical images for analysis, initiating the analysis process, displaying the diagnostic results.

Image processing device 203 may communicate with medical image database 204 to receive medical images. The medical images may be acquired by image acquisition devices 205. Image processing device 203 may automatically detect relevant calcium regions from the medical images and then compute or regress calcium scores for the detected calcium regions. In some embodiments, image processing device 203 may also determine the imaging modalities used to acquire the medical images. Additionally or alternatively, image processing device 203 may identify the region of interest first before detecting relevant calcium regions from the medical images received from medical image database 204.

Figure 3:
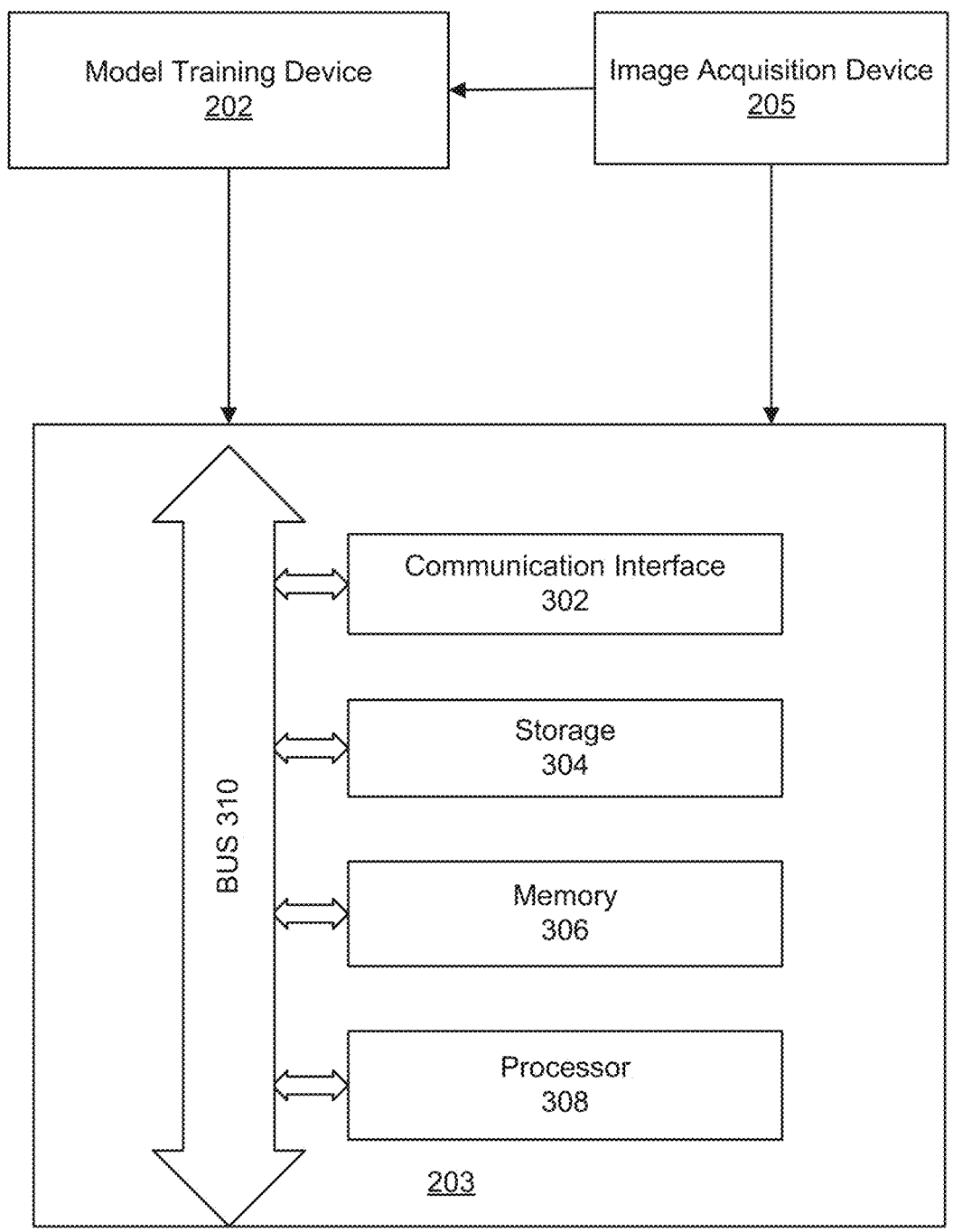
FIG. 3 illustrates a schematic diagram of an image processing device, according to certain embodiments of the present disclosure.

Systems and methods mentioned in the present disclosure may be implemented using a computer system, such as shown in FIG. 3. In some embodiments, image processing device 203 may be a dedicated device or a general-purpose device. For example, the image processing device 203 may be a computer customized for a hospital for processing image data acquisition and image data processing tasks, or a server in a cloud environment. The image processing device 203 may include one or more processor(s) 308 and one or more storage device(s) 304. The processor(s) 308 and the storage device(s) 304 may be configured in a centralized or distributed manner. The image processing device 203 may also include a medical database (optionally stored in storage device 304 or in a remote storage), an input/output device (not shown, but which may include a touch screen, keyboard, mouse, speakers/microphone, or the like), a network interface such as communication interface 302, a display (not shown, but which may be a cathode ray tube (CRT) or liquid crystal display (LCD) or the like), and other accessories or peripheral devices. The various elements of image processing device 203 may be connected by a bus 310, which may be a physical and/or logical bus in a computing device or among computing devices.

The processor 308 may be a processing device that includes one or more general processing devices, such as a microprocessor, a central processing unit (CPU), a graphics processing unit (GPU), and the like. More specifically, the processor 308 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor 308 may also be one or more dedicated processing devices such as application-specific integrated circuits (ASICs), field-programmable gate arrays (FPGAs), digital signal processors (DSPs), system-on-chip (SoCs), and the like.

The processor 308 may be communicatively coupled to the storage device 304 and configured to execute computer-executable instructions stored therein. For example, as illustrated in FIG. 3, a bus 310 may be used, although a logical or physical star or ring topology would be examples of other acceptable communication topologies. The storage device 304 may include a read-only memory (ROM), a flash memory, random access memory (RAM), a static memory, a volatile or non-volatile, magnetic, semiconductor, tape, optical, removable, nonremovable, or other types of storage device or tangible (e.g., non-transitory) computer-readable medium. In some embodiments, the storage device 304 may store computer-executable instructions of one or more processing programs and data generated when a computer program is executed. The processor may execute the processing program to implement each step of the methods described below. The processor may also send/receive medical data to/from the storage device.

The image processing device 203 may also include one or more digital and/or analog communication (input/output) devices, not illustrated in FIG. 3. For example, the input/output device may include a keyboard and a mouse or rackball that allow a user to provide input. The image processing device 203 may further include a network interface, illustrated as communication interface 302, such as a network adapter, a cable connector, a serial connector, a USB connector, a parallel connector, a high-speed data transmission adapter such as optical fiber, USB 3.0, lightning, a wireless network adapter such as a WiFi adapter, or a telecommunication (3G, 4G/LTE, etc.) adapter and the like. The image processing device 203 may be connected to a network through the network interface. The image processing device 203 may further include a display, as mentioned above. In some embodiments, the display may be any display device suitable for displaying a medical image and its segmentation results. For example, the image display may be an LCD, a CRT, or an LED display.

The image processing device 203 may be connected to model training device 202 and image acquisition device 205 as discussed above with reference to FIG. 2. Other implementations are also possible.

Figure 4A:
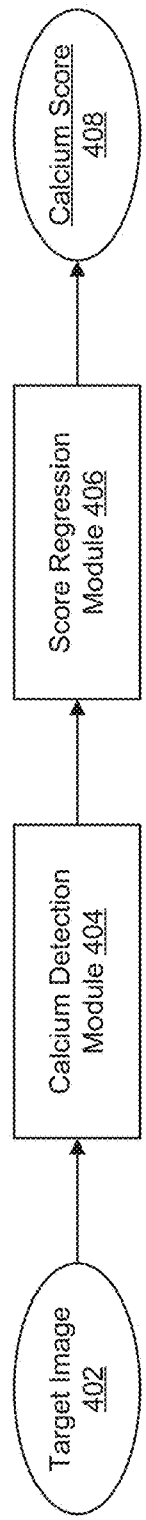
FIG. 4A illustrates a schematic overview of a workflow performed by the diagnostic image analysis system according to certain embodiments of the present disclosure.

FIG. 4A illustrates a schematic overview of a workflow performed by an image processing device of a diagnostic image analysis system (e.g., by using a diagnosis model) according to certain embodiments of the present disclosure. As shown in FIG. 4A, a target image 402, such as an NCCT image, CTA image, dual-energy CTA image, spectral CT image, MR image, ultrasound image, IVUS image. OCT image, or the like, may be processed sequentially by a group of modules, such as calcium detection module 404 and score regression module 406, to yield a calcium score 408, which may be presented in a human-readable format as one or more displayed images and text or in other formats, such as in a computer-readable format suitable for transmission to a further device. The details of each module are discussed in the following sections.

Calcium detection module 404 and score regression module 406 may employ deep learning or other machine learning models in detecting relevant calcium regions and regressing calcium scores. For example, calcium detection module 404 may employ active shape models or deep neural network-based models to identify calcium regions and determine whether an identified calcium region is relevant, as further described in detail below. In addition, in imaging modalities where calcium region can no longer be easily detected by a predefined threshold as used in NCCT images, more advanced models such as support vector machine (SVM) classifier, adaptive thresholding, clustering, and deep neural networks may be employed to identify calcium regions from more cluttered background based on more sophisticated cues. For score regression module 406, a deep neural network-based regressor may be also employed to regress calcium scores for relevant calcium regions, although linear regressors or other types of non-deep neural network-based regressors are also available.

In some embodiments, to allow calcium detection module 404 and score regression module 406 to work as expected, calcium detection module 404 and score regression module 406 may be trained prior to being used by the image processing device, in a training phase. In the inference phase or prediction phase, the image processing device is configured to compute or regress the calcium score 408 for input target image 402 using calcium detection module 404 and score regression module 406 with internal deep learning or machine learning models having been trained (modules 404 and 406 may be referred to as trained calcium detection module 404 and trained score regression module 406 at this point).

The training phase may refer to a process of tuning model parameters of deep learning or other machine learning models included in calcium detection module 404 and/or score regression module 406 to fit the training data. For instance, by providing input images with annotated "relevant" calcium regions, deep learning or other machine learning models included in calcium detection module 404 may be trained through adjusting the parameters included in the deep learning or other machine learning models, so that the outputs of these models may be optimized to match the annotated "relevant" calcium regions. In training score regression module 406, the ground truth calcium scores could be obtained using the gold standard scoring methods based on NCCT or its equivalent such as virtual NCCT images obtained by dual-energy CT. The ground truth may be also manually or semi-automatically obtained either from a same imaging modality as the input, or from a different imaging modality depending on the specific calcium scoring (e.g., volume/mass calcium score may also be obtained from IVUS besides NCCT) to be achieved. During the training process, the specific ground truth is employed to train the learning models. As a result during the testing process, the output obtained using the learning models will be close to what would be obtained if the medical image underwent the standard and traditional calcium scoring procedure.

In some embodiments, the training phase of calcium detection module 404 and score regression module 406 may be independent of each other. That is, each calcium detection module 404 and score regression module 406 may be independently trained as described above, and the trained calcium detection module 404 and score regression module 406 are then jointly implemented to infer the calcium score for an input image. In some embodiments, calcium detection module 404 and score regression module 406 may be trained together. That is, instead of using calcium detection module 404 and score regression module 406 that are separately and independently trained, a diagnostic image analysis system may use an end-to-end network that includes one or more machine learning models, e.g., one or more deep convolutional neural networks (CNNs) that can quantify the presence and extent of coronary calcium, where the one or more deep CNNs can be trained simultaneously.

Accordingly, in some embodiments, the various calcium detection module 404 and score regression module 406 (and also modality recognition module 410 and region of interest module 412 as will be described later) may be separately and individually implemented as various central processing units (CPUs), graphics processing units (GPUs), or by various threads running on individual cores of the same CPU or GPU for a diagnostic image analysis system. Alternatively, the modules 404 and 406 (and 410 and 412 as well) may be implemented in a set of networked hardware processors or in any other suitable way. While each module 404 or 406 shown in FIG. 4A may be realized as a separate physical device, other implementations are also possible, including the entire system being implemented as a single physical device, optionally together with an imaging device, such as an NCCT scan device.

As illustrated in FIG. 4A, the trained calcium detection module 404 (or simply calcium detection module 404) may take target image 402 as an input, and automatically detect relevant calcium regions from target image 402. For Agatston coronary calcium scoring, this means to identify regions of calcium deposit where the calcium deposit is "relevant", e.g., around the coronary artery instead of other locations such as the aorta. Traditional Agatston scoring computation uses a predefined threshold to identify calcium regions in NCCT images. But differentiating calcium around the coronary artery from calcium at other locations still requires human intervention in other existing calcium scoring systems. Calcium detection module 404, however, may automatically detect relevant calcium regions in NCCT images through one or more trained deep learning or other machine learning models included in calcium detection module 404.

In some embodiments, the trained calcium detection module 404 may detect calcium in different forms, depending on the medical images used for the training and target medical images subject to the diagnostic analysis. For instance, calcium detection module 404 may detect the calcium region center point locations, bounding boxes of each calcium region, or voxel-wise calcium mask, etc., as further described in detail in FIGS. 5A-5C.

Various deep learning or machine learning models may be applied as part of calcium detection module 404 to detect different forms/regions of calcium. For instance, advanced models such as SVM classifier, adaptive thresholding, clustering, and deep neural networks may be employed to identify calcium regions from more cluttered backgrounds based on more sophisticated cues. Accordingly, in some embodiments, multiple deep learning or machine learning models may be included in a single calcium detection module 404, which then allows the disclosed diagnostic image analysis system to detect calcium in different forms and/or images from different image modalities. Additionally and/or alternatively, a same deep learning or machine learning model (e.g., a CNN model) with different parameters may be applied to detect calcium in different forms and/or images from different imaging modalities. Accordingly, in some embodiments, the disclosed diagnostic image analysis system may further include a modality recognition module that can detect imaging modality for an image input into the system, as further described in detail in FIG. 4B.

The trained score regression module 406 (or simply score regression module 406) may compute or regress a calcium score for the calcium detected by calcium detection module 404. Score regression module 406 may take the output of calcium detection module 404 as the input. The output of the calcium detection module 404 may include an indication of the detected calcium in target image 402. Score regression module 406 may compute or regress a calcium score for the detected calcium based on the brightness of the calcium in the target image.

In some embodiments, due to the different imaging modalities and/or different regions, the detected calcium may be in different forms and/or have different brightness between images from different imaging modalities. However, the regression deep learning or machine learning model(s) included in score regression module 406 may have been trained (e.g., through adjusting parameters) to adapt to different imaging modalities and/or different regions, so that the output calcium score equals what would be obtained if the patient underwent the standard and traditional calcium scoring procedure (e.g., traditional Agatston scoring).

In some embodiments, score regression module 406 may compute or regress the calcium score for an image by taking certain intermediate results of the detected calcium into consideration. For instance, certain probability and/or feature maps may be taken into consideration in computing or regressing the calcium score for a target image, including different calcium regions of the target image. The intermediate results, such as the probability map and feature map, may provide feature information about the distribution pattern of the detected calcium in specific locations of a detected calcium region, and thus may provide a certain clue in computing or regressing the calcium score of specific locations.

In some embodiments, score regression module 406 may compute or regress an overall calcium score for a target image as a whole. This may provide a general view of how serious the calcium deposit occurs in a specific vessel. In some embodiments, score regression module 406 may compute or regress a calcium score over each individual instance of detected calcium region, such as a calcium voxel, or an individual connected component, such as a bounding box, etc. By computing a calcium score for each detected instance, score regression module 406 may provide more insightful information about calcium deposits in a specific vessel, which may lead to a better treatment plan or a more effective preventive strategy. In some embodiments, both overall calcium score and instance-specific calcium scores may be computed or regressed by score regression module 406. Depending on the configurations, more than one deep learning or machine learning model may be included in score regression module 406, so that instance-specific calcium scores and/or overall calcium score can be computed or regressed simultaneously for images taken using different imaging modalities.

In some embodiments, after the computation or regression of the instance-specific calcium scores and/or overall calcium score, the obtained calcium score(s) may be presented in a human-readable format as one or more displayed images and text. For instance, an overall calcium score may be presented as an independent report or as text alongside the input image. In another example, instance-specific calcium scores may be presented as text overlaid in positions corresponding to each instance of detected calcium. Depending on the configuration of the diagnostic image analysis system, other forms of computed calcium score(s) reporting are also possible and are contemplated.

It is to be noted that the disclosed diagnostic image analysis system is not limited to the workflow and the corresponding components shown in FIG. 4A. In some embodiments, additional components may be included in a diagnostic image analysis system, as further described below.

Figure 4B:
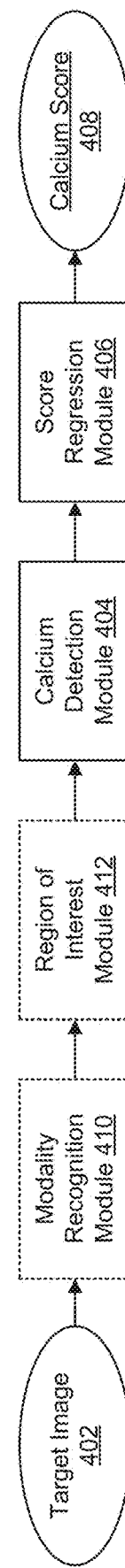
FIG. 4B illustrates a schematic overview of another workflow performed by the diagnostic image analysis system according to certain embodiments of the disclosure.

FIG. 4B illustrates a schematic overview of another workflow performed by the image processing device of the diagnostic image analysis system according to certain embodiments of the present disclosure. As illustrated, a diagnostic image analysis system may further include a modality recognition module 410 configured to recognize an imaging modality of the input image, and a region of interest module 412 configured to identify a region of interest for the input image. By including these two modules 410 and 412, the efficiency and accuracy in detecting relevant calcium regions and/or calcium score calculation may be further improved.

In some embodiments, by including modality recognition module 410 in a diagnostic image analysis system, the imaging modality for a target image may be recognized. That is, the input image may be classified by modality recognition module 410 into one of the preset modalities (NCCT, CTA, MR, ultrasound, IVUS, OCT, etc.).

In some embodiments, modality recognition module 410 may recognize the imaging modality for an input target image 402 based on certain information associated with target mage 402. For instance, target image 402 may include certain metadata information associated with the image. The metadata information may include relevant information for the image, such as the format (e.g., JPEG, DNG, PNG, TIFF, etc.) of the image, certain descriptive information about the visual content of the image, such as the headline, caption, keywords, etc., and/or non-visual content of the image, such as the location where the image was taken, the device used to take the image, person who took the image, and/or certain instructions for interpreting the image, etc. Based on this metadata information, the imaging modality for taking the image may be identified. In some embodiments, a user profile for the patient associated with the image may be also obtained, which may include certain disease information associated with the patient, hospital(s) that the patient has visited, the doctor(s), and imaging specialists that have diagnosed or assessed the patient, etc. The patient information may provide a certain clue in recognizing the imaging modality for an input image. For instance, the historical data of the patient may indicate that a specialist has provided an NCCT scan for the patient before. If the metadata information of the target image indicates that the image is taken by the same specialist, the image may be likely an NCCT scan too. It is to be noted that other approaches for recognizing the imaging modality are also possible and are contemplated by the disclosure.

In some embodiments, due to the variability of contrast agents in enhanced CT images, image intensity differs significantly from patient to patient. By identifying the correct modality, subsequent modules 412, 404, and 406 will adjust parameters accordingly specifically for that modality. For instance, modality recognition module 410 may provide additional information such as average intensities in the aorta area (or clue for obtaining such information) for the following modules, so that certain parameters may be adjusted correspondingly based on this information.

Region of interest module 412 may identify a region of interest (ROI) from an input image. This includes identifying a region containing a calcium-depositing vessel from an input image. In some embodiments, an ROI identified by region of interest module 412 can replace the original image in image processing for the reason that the portion contained in the ROI image includes the main information and key information for diagnosis purposes. As a result, the analysis of the image may be then focused on the ROI, which can reduce the amount of calculation, and thus can better deal with the rapid growth of image data in medical diagnosis. In addition, a medical image usually contains other anatomical structures, such as ribs, that could be easily mistaken as calcification by a computer vision system. By reducing the field of view and focusing on the RIO (e.g., an area containing the coronary artery) can therefore effectively reduce the number of fake positives. Region of interest module 412 may thus be implemented in order to define the region containing the target vessels so that the subsequent analysis could focus only on the ROI.

In some embodiments, different techniques may be employed to obtain an ROI from an input image. For instance, certain segmentation techniques may be applied to obtain an ROI. In one example, a pixel-based segmentation may consider the pixels in an image, but no other information in the image, such as spatial location information, texture information, and so on, so this approach is generally used for preprocessing an input image. In another example, a region-based segmentation may take into consideration of the spatial information between pixels. In yet another example, a boundary-based segmentation may use characteristics of the edge gray value change to identify an ROI. In some embodiments, a model-based approach may be applied for determining the ROI, which may include certain deep learning or other machine learning models. In implementations, these deep learning or machine learning models for segmentation may be also trained as discussed above before being applied to identify an ROI. Other segmentation or even non-segmentation-based approaches may be also applied to identify an ROI from an input image.

In some embodiments, the identified ROI may be forwarded to calcium detection module 404 for calcium detection, as illustrated in FIG. 4B. Accordingly, calcium detection module 404 may detect calcium from an ROI instead of the whole target ma e 402. This may reduce the number of false positives and reduce the amount of calculation in calcium detection. The calcium region detected by calcium detection module 404 may be then forwarded to score regression module 406 for computing or regressing the calcium score for the identified calcium region, which is then output for reporting the result of calcium scoring, as described above in FIG. 4A.

Figure 5A:
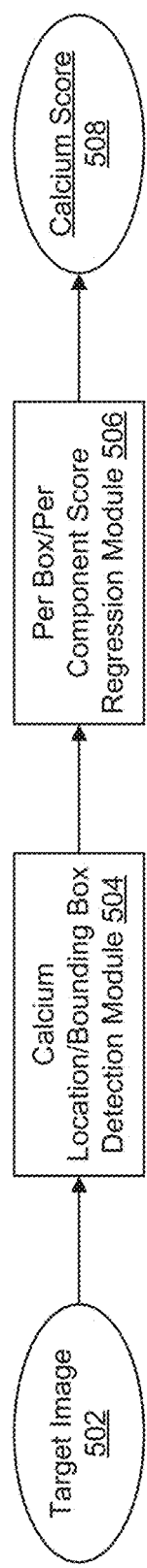
FIGS. 5A-5C illustrate schematic overviews of specific workflows performed by the diagnostic image analysis system according to certain embodiments of the present disclosure.
Figure 5B:
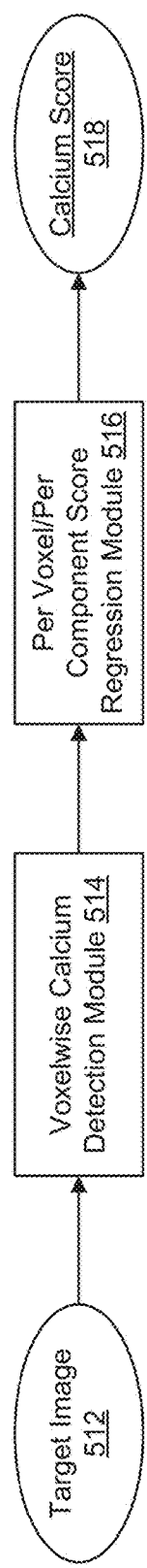
Figure 5C:
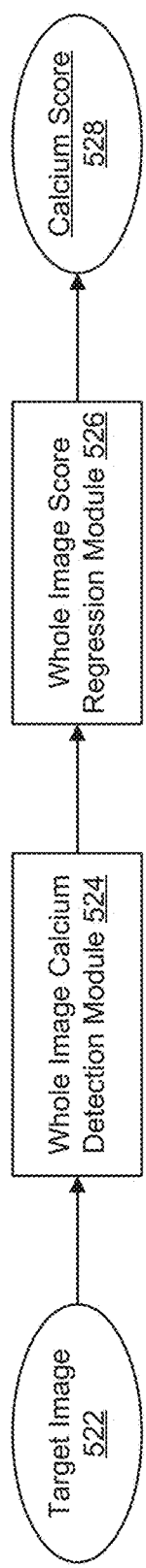

FIGS. 4A-4B illustrate general workflows performed by the diagnostic image analysis system according to certain embodiments of the present disclosure. In the next, FIGS. 5A-5C illustrate some specific workflows performed by the diagnostic image analysis system according to certain embodiments of the present disclosure. Briefly, in real applications, based on the specific needs, calcium detection module 404 and score regression module 406 in a diagnostic image analysis system may be implemented in different forms to perform specific tasks in calcium scoring.

In FIG. 5A, calcium detection module 404 may be implemented as a calcium location/bounding box detection module 504, and score regression module 406 may be implemented as a per box/per component score regression module 506. That is, when detecting calcium deposit in a target image 502, calcium detection module 404 may detect the calcium deposit as the calcium region center point locations, and/or bounding boxes of each calcium region, and thus may be referred to as calcium location/bounding box detection module 504. In this embodiment, score regressing module 406 may regress a calcium score for each calcium region or bounding box, and thus may be referred to as per box/per component score regression module 506. That is, a calcium score is computed or regressed for each calcium instance (e.g., each calcium region or each calcium bounding box). The overall calcium score at the whole image level may be then obtained by aggregating, e.g., summing up, the individual computed or regressed calcium scores.

To achieve the specific functions as described above, a detection neural network may be included in calcium location/bounding box detection module 504 to generate relevant calcium bounding boxes or calcium regions, and a linear regressor, deep neural network-based regressor, or other types of regressor may be included in per box/per component score regression module 506 to compute or regress a regional calcium score for each bounding box/calcium region. During the training phase, the relevant ground truth calcium region/bounding box and the ground truth calcium score may be distributed to each calcium region/bounding box to train calcium location/bounding box detection module 504 and the per box/per component score regression module 506, so that, when applied, a regional calcium score may be computed for each bounding box or calcium region.

In FIG. 5B, another specific workflow is illustrated for voxel-wise calcium detection and scoring. Specifically, according to one embodiment, calcium detection module 404 may be implemented as a voxel-wise calcium detection module 514, and score regression module 406 may be implemented as a per voxel/per component score regression module 516. That is, when detecting calcium deposits in a target image 502, calcium detection module 404 may detect the calcium deposit as a voxel-wise calcium mask, and thus may be referred to as voxel-wise calcium detection module 514. In this embodiment, score regressing module 406 may regress a regional calcium score at each voxel or each calcium region (e.g., each calcium mask), and thus may be referred to as per voxel/per component score regression module 516. The overall calcium score at the whole image level is then obtained by summing up each computed or regressed calcium score.

To achieve the specific functions as described above, a segmentation neural network may be included in voxel-wise calcium detection module 514 to generate voxel-wise relevant calcium masks, and a linear regressor, deep neural network-based regressor, or other types of regressor may be included in per voxel/per component score regression module 506 to compute or regress a calcium score for each voxel-wise relevant calcium mask. During the training phase, the ground truth voxel-wise relevant calcium mask and the ground truth calcium score may be distributed to each voxel-wise calcium mask to train voxel-wise calcium detection module 514 and per voxel/per component score regression module 506.

In FIG. 5C, still another specific workflow is illustrated for whole image calcium detection and scoring. Specifically, according to one embodiment, calcium detection module 404 may be implemented as a whole image calcium detection module 524, and score regression module 406 may be implemented as a whole image score regression module 516. That is, when detecting calcium deposits in a target image 502, calcium detection module 404 may detect any form of relevant calcium regions included in the target image and consider them as a whole, and thus may be referred to as whole image calcium detection module 514. Different from the score regression modules illustrated in FIGS. 5A-5B, the score regressing module illustrated in FIG. 5C may directly compute or regress the calcium score in the target image as a whole, and thus may be referred to as whole image score regression module 516.

For example, if a bounding box-based calcium detection module is used in whole image calcium detection module 514, whole image score regressing module 516 may use a recursive neural network to process the whole series of all calcium regions to generate a single calcium score for the whole image. By using a whole image score regression module, the need to distribute ground truth calcium score values to finer scales may be eliminated during the training process of the deep learning or other machine learning models, which may simplify the processing in preparing the samples for the training phase.

It is to be noted that the workflows in FIGS. 5A-5C are merely a few example workflows performed by the diagnostic image analysis system. In real applications, the disclosed diagnostic image analysis system may perform additional tasks by modifying one or more workflows from FIGS. 5A-5C. An example method for calcium scoring by the disclosed diagnostic medical image analysis system is further described in FIG. 6.

Figure 6:
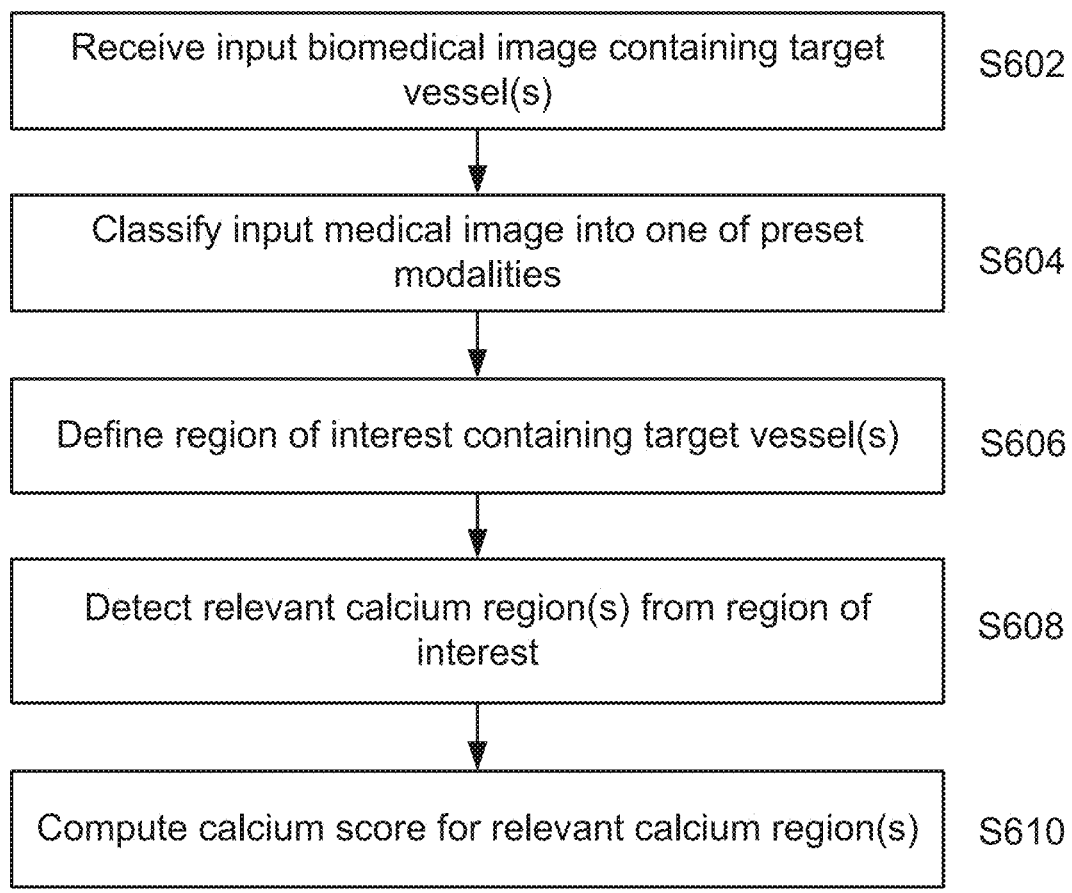
FIG. 6 is a flowchart of an example method 500 for medical diagnostic image analysis, according to certain embodiments of the disclosure.

FIG. 6 is a flowchart of an example method 600 for diagnostic medical image analysis, according to embodiments of the disclosure. As shown in FIG. 6, method 600 may begin, at step S602, with receiving an unannotated input medical image containing target vessel(s) of a patient. The input image can be one of an NCCT, CTA, MR, ultrasound, IVUS, or OCT image, and so on. Here, the input medical image is not annotated for the relevant calcium region(s) and/or the corresponding calcium score(s). The unannotated input medical image may have certain headline, caption, or keywords that provide certain context related to the imaging capturing process, but does not include an expert's annotation about the calcium deposit.

The method may further include, at step S604, classifying the unannotated input medical image into one of preset modalities. example, processor 308 of the disclosed diagnostic medical image analysis system may retrieve metadata related to the input medical image, and identify the imaging modality used for capturing the input image based on the metadata information. In one example, processor 308 may identify that the imaging modality for capturing the input medical image is an NCCT scan. In some embodiments, the image type, image size, and other related information may be also used to identify the imaging modality for taking the input image.

The method may further include, at step S606, identifying a region of interest containing the target vessel(s). For instance, processor 308 may identify a region of interest by using one or more segmentation methods, so that the later image processing is focused on only the region of interest, but not other portions of the input medical image. This may reduce the computing resource required for later calcium region detection. In addition, by reducing the field of view and focusing on the region of interest (e.g., an area containing the coronary artery), the number of false positives can be effectively reduced.

The method may further include, at step S608, detecting relevant calcium region(s) from the region of interest, For instance, processor 308 may use one or more trained deep learning or other machine learning models to detect relevant calcium regions from the region of interest from the input medical image. In some embodiments, step S606 may be optional and in step S608, processor 308 may directly detect calcium regions from the input image without requiring the detection of the region of the interest first.

The method may further include, at step S610, computing or regressing a calcium score for the detected relevant calcium region. For instance, processor 308 of the disclosed diagnostic image analysis system may compute or regress a calcium score for each detected calcium region by using one or more deep neural network-based regressors trained for calcium score computation, or by using linear regressor or other non-neural network-based regressors.

In some embodiments, although not shown in FIG. 6, an overall score may be further calculated for the input image by summing up the calcium score computed for each relevant calcium region, In some embodiments, the computed overall calcium score and/or calcium score for each detected region may be presented to a user (e.g., a doctor, a technician, a specialist, a patient, etc.) in a readable format (e.g., in text format alongside the input image, overlaid on the image, or as an independent report).

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for determining a calcium score from a medical image, comprising:
    a communication interface configured to receive the medical image acquired of a subject by an image acquisition device; and
    at least one processor, configured to:
        classify the medical image into one of preset modalities, each preset modality being associated with a different imaging technology;
        adjust parameters for a score regression learning model used to determine the calcium score based on the one of preset modalities into which the medical image is classified;
        apply a calcium detection model to detect at least one calcium region relevant in determining a calcium score from the medical image;
        apply the score regression learning model to the at least one calcium region to determine a calcium score for the medical image; and
        provide the determined calcium score of the medical image for a diagnosis of the subject,
            wherein the calcium detection model and the score regression learning model are jointly trained by using output information from the calcium detection model as input information into the score regression learning model for determining calcium scores.

2. The system of claim 1, wherein, to detect at least one calcium region, the at least one processor is further configured to:
    detect a region of interest (ROI) containing a target vessel in the medical image; and
    detect each calcium region for the medical image by detecting a calcium-containing region in the ROI containing the target vessel.

3. The system of claim 1, wherein the calcium detection model includes one or more of an active shape model, adaptive thresholding, support vector machine (SVM) classifier, or deep neural network-based model, to identify the at least one calcium region from the medical image.

4. The system of claim 1, wherein, to detect the at least one calcium region, the at least one processor is further configured to:
    determine a bounding box for each calcium region,
    wherein, to determine the calcium score for the medical image, the at least one processor is further configured to:
    determine a regional calcium score for each bounding box; and
    determine the calcium score for the medical image based on the regional calcium score for the at least one calcium region.

5. The system of claim 1, wherein, to detect the at least one calcium region, the at least one processor is further configured to:
    detect a voxel-wise calcium mask from the medical image, wherein the voxel-wise calcium mask including a plurality of voxels,
    wherein, to determine the calcium score for the medical image, the at least one processor is further configured to:
    determine a regional calcium score for each voxel; and
    determine the calcium score for the medical image by summing up the regional calcium scores of the respective voxels included in the voxel-wise calcium mask.

6. The system of claim 1, wherein, to detect the at least one calcium region, the at least one processor is further configured to:
    detect a plurality of calcium regions from the medical image,
    wherein the score regression learning model is a recursive neural network, wherein, to determine the calcium score for the medical image, the at least one processor is further configured to:
    apply the recursive neural network to the plurality of calcium regions collectively to regress the calcium score in the whole medical image.

7. The system of claim 1, wherein the score regression learning model is trained by determining sample regional calcium scores based on a ground truth calcium score in training data and distributing the sample regional calcium scores to corresponding ground truth calcium regions derived from the training data.

8. The system of claim 1, wherein the calcium detection model or the score regression learning model is trained using training data including non-contrast computed tomography (NCCT) images or virtual NCCT images and their corresponding ground truth calcium scores.

9. A computer-implemented method for determining a calcium score from a medical image, comprising:
    applying a modality recognition model to classify the medical image into one of preset modalities, each preset modality being associated with a different imaging technology;

adjusting parameters for a score regression learning model used to determine the calcium score based on the one of the present modalities into which the medical image is classified;

receiving the medical image acquired of a subject by an image acquisition device;

applying a calcium detection model to detect at least one calcium region relevant in determining a calcium score from the medical image;

applying the score regression learning model to the at least one calcium region to determine a calcium score for the medical image; and providing the determined calcium score of the medical image for a diagnosis of the subject, wherein the calcium detection model and the score regression learning model are jointly trained by using outputting information from the calcium detection model as input information into the score regression learning model for determining calcium scores.

10. The computer-implemented method of claim 9, wherein detecting at least one calcium region relevant from the medical image further comprises:

applying a region of interest (ROI) module to detect a region of interest (ROI) containing a target vessel in the medical image; and detecting each calcium region for the medical image by detecting a calcium-containing region in the ROI containing the target vessel.

11. The computer-implemented method of claim 9, wherein the calcium detection model includes one or more of an active shape model, adaptive thresholding, support vector machine (SVM) classifier, or deep neural network-based model, to identify the at least one calcium region from the medical image.

12. The computer-implemented method of claim 11, wherein determining the calcium score for the calcium region further comprises:
determining a bounding box for the calcium region; and determining the calcium score for the medical image further comprises:
determining a regional calcium score for each bounding box; and
determining the calcium score for the medical image based on the regional calcium score for the at least one calcium region.

13. The computer-implemented method of claim 11, wherein detecting the at least one calcium region further comprises:
detecting a voxel-wise calcium mask from the medical image, wherein the voxel-wise calcium mask including a plurality of voxels; and determining the calcium score for the medical image further comprises:
determining a regional calcium score for each voxel; and
determining the calcium score for the medical image by summing up the regional calcium scores of the respective voxels included in the voxel-wise calcium mask.

14. The computer-implemented method of claim 9, wherein detecting the at least one calcium region further comprises:
detecting a plurality of calcium regions from the medical image; and the score regression learning model is a recursive neural network, and determining the calcium score for the medical image further comprises:
applying a recursive neural network to the plurality of calcium regions collectively to regress the calcium score in the whole medical image.

15. The computer-implemented method of claim 9, wherein the score regression learning model is trained by determining sample regional calcium scores based on a ground truth calcium score in training data and distributing the sample regional calcium scores to corresponding ground truth calcium regions derived from the training data.

16. A non-transitory computer-readable medium having a computer program stored thereon, wherein the computer program, when executed by at least one processor, performs a method for determining a calcium score from a medical image, the method comprising:

receiving the medical image acquired of a subject by an image acquisition device;

classifying the medical image into one of preset modalities, each of the preset modalities being associated with a different imaging technology;

adjusting parameters for a score regression learning model to correspond to the one of the preset modalities into which the medical image is classified;

applying a calcium detection model to detect at least one calcium region relevant in determining a calcium score from the medical image;

applying the score regression learning model to the at least one calcium region to determine a calcium score for the medical image; and providing the determined calcium score of the medical image for a diagnosis of the subject.

* * * * *